United States Patent [19]

Watts et al.

[11] 3,932,568

[45] Jan. 13, 1976

[54] HIGH-ENERGY BRAKE AND BRAKE COMPONENTS

[75] Inventors: Willie H. Watts, Massillon; Francis J. Lowey, deceased, late of Medina County, Ohio; by Old Phoenix National Bank, executor, Medina, Ohio

[73] Assignee: Friction Products Inc., Medina, Ohio

[22] Filed: June 26, 1973

[21] Appl. No.: 373,802

[52] U.S. Cl. ............... 264/29; 106/36; 188/251 A; 192/107 M; 260/38
[51] Int. Cl.² .......................................... B29C 25/00
[58] Field of Search ............ 264/29; 260/38; 106/36; 192/107 M; 188/251 A

[56] References Cited
UNITED STATES PATENTS

| | | | |
|---|---|---|---|
| 3,438,858 | 4/1969 | Howard et al. ..................... | 264/29 |
| 3,552,533 | 1/1971 | Nitz ..................................... | 264/29 |
| 3,647,722 | 3/1972 | Albertson et al. .................... | 260/38 |
| 3,708,451 | 1/1973 | McWhorter et al. ................ | 264/29 |
| 3,759,353 | 9/1973 | Marin ................................. | 423/447 |

Primary Examiner—Lorenzo B. Hayes
Attorney, Agent, or Firm—T. A. TeGrotenhuis

[57] ABSTRACT

Molded articles of carbon or graphite suitable as heat absorbing or friction elements in brakes for jet aircraft are made by coating devolatilized carbon particles with a phenolic resin, especially boronated phenolic resin, reducing the volatile content of the coated carbon to below a critical value, mixing these with a resin coated or uncoated powdered abrasive, molding under critical pressures and temperatures, and then postcuring the resin and carbonizing and optionally graphitizing the product according to a schedule whereby delamination is avoided.

17 Claims, 9 Drawing Figures

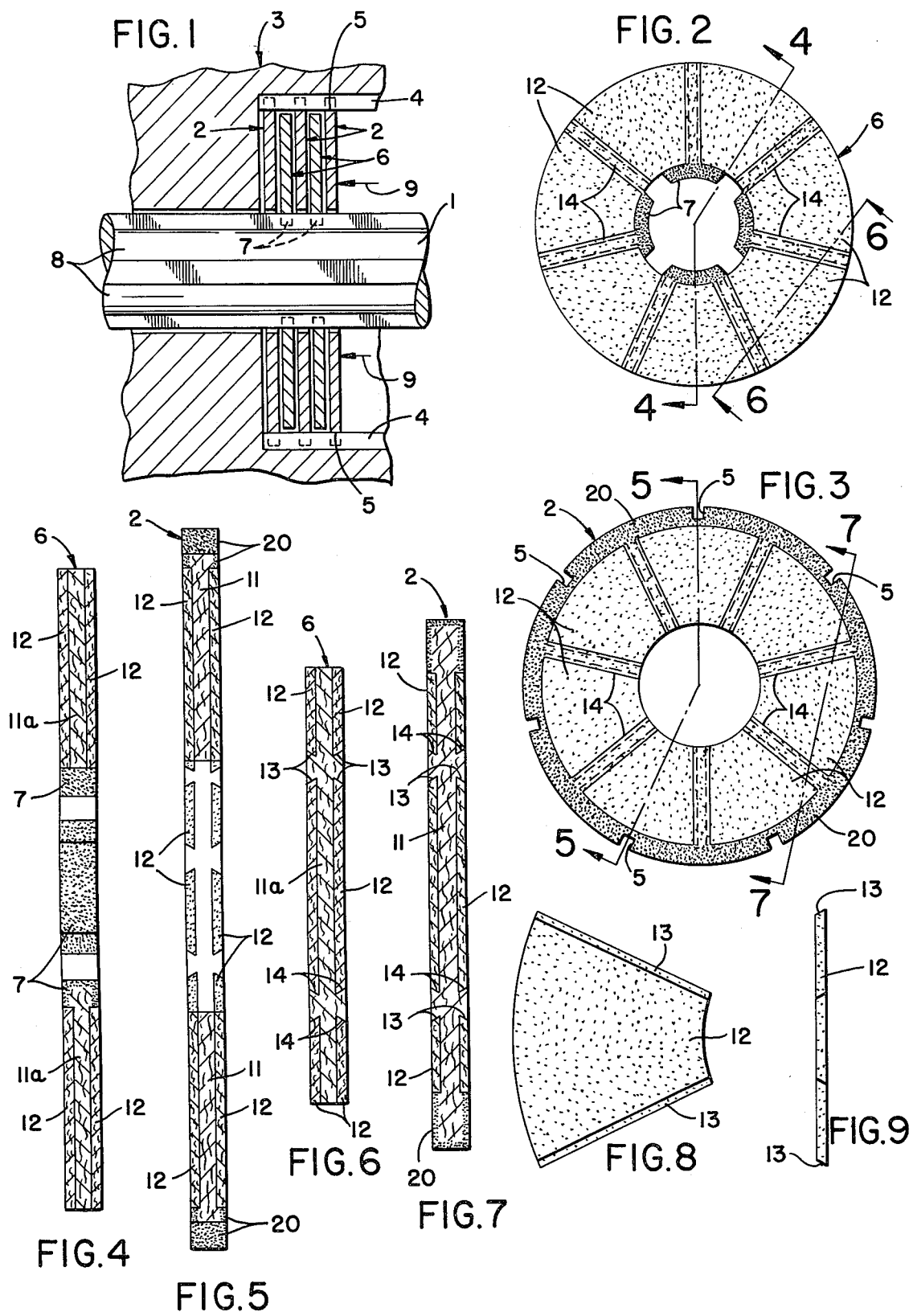

HIGH-ENERGY BRAKE AND BRAKE COMPONENTS

The present invention relates to molded carbon base or graphite base articles especially those which are components of brakes suitable for high-speed aircraft and to a method of making same. It particularly relates to brakes and brake components capable of absorbing excessive amounts of rapidly applied energy, as required in the rapid stopping of large, highly loaded aircraft.

Aeroplane brakes must be capable of stopping a fully loaded jet plane under conditions of so-called rejected take-off (RTO). Under such conditions, a plane that has been accelerated at take-off speed must be capable of being stopped by brakes alone within the remaining unused runaway. In the RTO test, the energy applied at the surface of the friction components is so great that warping and fusion of the metallic components may take place. Brakes having friction components made of steel and the usual copper-base friction materials may fail in a single RTO test. Although iron is a much better heat-sink than copper, neither iron nor copper have the energy-absorbing capabilities required to maintain temperature at an acceptable level for the materials. Carbon, even though it is in the form of graphite, on the other hand, has a much greater specific heat than even iron and is a good conductor. If carbon were used in place of the metal discs as the brake components, a far superior brake should be obtained. Unfortunately, in the past, carbon has been considered of insufficient strength and too readily combustible to serve as direct replacements for discs of iron. When carbon or graphite-base friction elements were used in the past, it had been considered necessary to utilize so-called button brake construction wherein carbon was disposed within the cavity of relatively small buttons or cups which were welded or otherwise fastened to the metal disc supports. The carbon or graphite material had insufficient strength and resistance to oxidation at elevated temperatures to be used as a disc or support element itself or even as the core material on which friction elements are carried.

It is an object of the present invention to provide molded articles of high strength by a process wherein the molded article is stripped at molding temperature and is cured, carbonized and graphitized free standing without support or slumping.

It is another object of the present invention to provide carbon or graphite material which has high strength and greatly increased ability to absorb energy or serve as a heat-sink, and which may be used in place of metal disc or support components normally used in airplane brakes.

It is a further object of the present invention to provide a method of making graphite-base molded articles wherein the materials are converted to graphite form in a relatively short time.

It is a further object of the present invention to provide a method of making graphite-base friction components with a desired controlled coefficient of friction that is suitable for use against other carbon or graphite components or against other frictional elements, and which may be bonded or integrally attached to a suitable highstrength carbon-graphite base core.

A further object of the present invention is to provide carbon or graphite brake components having portions of greater resistance to oxidation than those heretofore produced.

Other objects of the present invention will be apparent from the following description of the invention as applied to aeroplane brakes which are illustrated by the accompanying drawing, in which:

FIG. 1 is a sectional view through a portion of a brake having relatively rotatable components embodying the present invention;

FIG. 2 is a plan view of one of the relatively rotatable friction components shown in FIG. 1 of a brake embodying the present invention;

FIG. 3 is a plan view of a cooperative, relatively rotatable friction component of a brake embodying the present invention;

FIG. 4 is a sectional view taken on the line 4—4 of FIG. 2;

FIG. 5 is a sectional view taken on the line 5—5 of FIG. 3;

FIG. 6 is a sectional view taken on the line 6—6 of FIG. 2;

FIG. 7 is a sectional view on the line 7—7 of FIG. 3;

FIG. 8 is a plan view of one of the several graphite friction elements which are carried by and attached to the face portions of the graphite base core of the components of FIGS. 2 and 3; and FIG. 9 is an end view of the friction element of FIG. 8.

Referring more particularly to the drawing, in which like parts are designated by like numberals of reference throughout the several views, brakes utilizing the present invention may comprise a plurality of relatively rotatable disc-like components, each having a central opening to receive a suitable shaft 1. One of the alternate components 2 is carried by the rotatable housing 3 which is provided with inwardly projecting ribs or splines 4 that are received in the grooves 5 in the components 2 to carry the element 2 in nonrotatable relation with respect to the housing. The alternate elements 6 are carried on the nonrotatable shaft 1 in nonrotatable relation thereto. Elements 6 are provided with inwardly extending projections 7 which fit within the grooves 8 of the shaft 1 so that they fixedly rotate with the shaft 1. When axial pressure is applied in the direction of the arrow 9, pressing the elements 2 and 6 strongly into contact with each other, friction developed at the contacting flat faces by the relative rotation of the elements absorbs energy of rotation from the shaft 1 and acts as a brake.

In the brakes with which the present invention is concerned, at least one and preferably both of the components 2 and 6 are composed essentially of an especially compounded carbon-base material, preferably in the form of a graphite. In the preferred form of the invention, the components 2 and 6 comprise strong disc-like carbon cores 11 and 11a, respectively, preferably having most of the carbon in graphitic form and having suitably attached to both the side faces thereof, preferably in an integral manner, a plurality of friction elements 12. The friction elements 12 are also largely of carbon, preferably in graphitic form and are preferably of higher density than the cores. The friction elements may have bevelled or sloping side edges 13 and are narrower at their outer face than at the bottom portions, so that the end view thereof is trapezoidal. The cores 11 and 11a may be molded and shaped against the preshaped and pregraphitized friction elements 12 disposed or positioned so that they are spaced as desired over the faces of the composite consisting of cores 11 or 11a and elements 12. The core material is plastic and the friction material is in graphitic nonplastic form. In the molding operation, portions of the core flow over the bevelled edges of the elements into the core 11 or 11a. If desired the cores may be formed first in final shape with cavities formed therein either by molding or machining. Any dense skin is removed and one or more friction elements cemented in said cavities to the core in a suitable manner with a carbonaceous type cement.

When a cement joint is produced, the cement should be carbonized or graphitized in suitable manner. After formation of the composite, the composite is preferably impregnated with a graphitizing liquid such as furfuryl alcohol, phenol-aldehyde resin, etc., and further graphitization accomplished. One or more additional impregnations and subsequent graphitizations may be used.

The particular ingredients making up the molded elements such as the core and friction elements of brakes are of exceptional importance in obtaining the strength, the heat absorption and frictional properties necessary. By properly selecting and combining the ingredients forming the core and friction elements, and properly treating the ingredients forming the core and friction elements, and properly treating the ingredients after mixing and compacting during the graphitization and shaping or molding process, non-warping brake components of exceptionally high strength coupled with excellent heat-sink ability may be obtained without requiring enclosure of the materials within cup-shaped metal cavities to provide the essential strength.

The combustion and rapid oxidation of the more exposed outer peripheral portions 20 of the disc 2 and the inner splined or attached portion 7 may be reduced by suitably incorporating oxidation inhibitors therein. Peripheral portions 20 and the inwardly projecting portions 7 may be vapor coated with a metal, such for example as copper, nickel, aluminum, tantalum, etc. Oxidation inhibitors such as organic borates, boronated phenols in the resin, zinc borate, zinc phosphate, manganese phosphate, zinc aluminum phosphate and antimony phosphates and oxides may be incorporated in the mixture or they may be suitably applied by impregnation when dissolved in suitable solvent.

The graphite-base components, including both the core 11 or 11a and the friction elements 12, in accordance with the present invention are prepared from a mixture comprising essentially a powdered carbon (preferably graphite) and a resin convertible to carbon and graphite to serve as a binder. The core material additionally contains carbon fibers (preferably in graphite form). The friction elements additionally comprise a powdered friction component or abrasive that is stable against melting and combining with carbon at graphitizing temperatures. It may also contain some carbon (including graphite) fibers to increase wear resistance. One of the preferred abrasives is a finely divided silicon carbide. Tungsten carbide is also desirable.

The powdered carbon may be a coke such as a powdered (95 ± 5 percent through 200-mesh screen), petroleum coke, calcined at 1,000°C. +, as obtainable from Great Lakes Carbon Company, Niagra, N.Y., but a natural or artifical graphite is preferred. In the case of graphites, the average particle size should be less than 30 microns, and preferably less than 6 microns. Graphites having a particle size such that, most will pass through a 200-mesh screen is found to be desirable and such has a particle size of about 30 microns or so. I have found, however, that the natural South West Graphite when properly used, provides strengths and densities above those obtainable with other graphites. Artificial graphite such as Union Carbide's Grade-195 Powder, a cokebase graphite graphitized at 2400°C. to 2600°C., is also highly desirable and provides less objectionable volatile matter or contaminates. The particle size of the 195-Powder is such that 81 percent is less than 30 microns in size. Pyrolytic graphite of less than 200-mesh particle size has also provided good resistance to abrasion. Coke powder is also useable but requires somewhat different treatment from graphite.

The carbon fibers greatly increase strength of the core material and also provides passageways for escape of gases during carbonizing and graphitizing steps. They should preferably be in graphite form. When the fibers are used in the friction elements they are preferably short fibers, say less than one-quarter inch or less. They are randomly disposed in the friction element. For the core material, longer graphite fibers are preferably used and they are preferably one-half inch or longer and in some measure oriented to take largest stress along their length. Thus, they are preferably in some measure oriented so that substantial portions are generally tangential to circles concentric with the periphery of the discs, or at least form a substantial angle with radii of said discs passing through the portions of the fibers.

The character of the binders used for coating and adhering together the carbon particles (whether or not in graphite or normal carbon form) is of utmost importance in the formation of the molded articles of the present invention. The pitches and tars usually used in making graphite articles heretofore are unsuitable. Resins of the phenolic type must be used. For brake components and friction elements that are subjected to high temperatures as in aircraft brakes subject to the severest conditions, it is found in accordance with the present invention that the boronated phenolic resins are outstanding. They provide much superior resistance to oxidation or destruction. For most of the somewhat less severe applications even in certain jet aircraft brakes, it is found that the condensation products of 2, 7 naphthylene diol, phenol and formaldehyde are generally satisfactory. Particularly desirable is the resol type condensation product of naphthylene diol, phenol and formaldehyde which is at least partially condensed in the presence of a weakly alkaline catalyst and containing a small amount such as 2 or 3 weight percent of hexamethylene-tetramine for curing. Such resin is sold in about a 60 percent solution in methyl ethyl keytone (MEK) by Ironside Resincs, Inc., of Columbus, Ohio under the trade name L-8 Resin.

When as hereinafter described the final condensation or curing of the resins on the coated particles takes place in an inert atmosphere such as nitrogen, a more ordinary and less expensive resol type condensation resin of phenol and formaldehyde may be used. Without additional oxidation inhibitors, composites prepared utilizing such resins alone have not withstood the severe conditions required for brake elements even though molded articles containing such resins have high strength and are satisfactory for most applications.

The compounding procedure is highly important also in producing the articles of our invention. The procedure that is especially adapted for production of the dense friction elements but also usable for cores is designed to reduce the volatiles as much as possible before molding or pressing. volatiles must be permitted to escape from the shaped material during curing, carbonization and graphitization. It has been found that the powdered and fibrous particles preferably should be first dried to constant weight at elevated temperatures, such as 350°F., and then after cooling to about 200° to 250°F., they should be mixed with resin which is preferably preheated to about 200°F. The mixing may be in a sigma blade mixer and may be continued at least until room temperature is reached. The material is devolatized until volatile content is less than 5 percent and preferably 1 or 2 percent at 180°F. The devolatilization is as much as possible so that dense preforms may be removed at molding temperature without delaminating. The precoating may of course be accomplished by use of a solvent dispersion of resin, tumbling or grinding the mixture of particles therein, and oven-drying the particles under vacuum. Alternatively, an aqueous dispersion of resin may be used for coating the particles which are thereafter devolatilized to a similar extent. The devolatilization is expedited and uniformity obtained particularly if little or no solvent is used by pressing the resin mixture to thin sheet form, say 1/16 inch thickness and 20 inches breaking up and micropulverizing the hard sheet. The greater ease in providing compounding variations is had by separately agitating each type of particle and fiber in the desired amount of resin or resin solution, and removing the solvent or liquid below resin-curing temperature, i.e., below the exothermic temperature, in a vacuum oven or vacuum chamber. The amount of resin applied on some of the various components is frequently greater than the amount on others. The components may separately be coated, dried and mixed, or they may be coated in admixture with each other.

After mixing the desired coated components in accordance with our hereinafter described dry process, they may be homogenized as a dry powder by a suitable blender or micropulverizing apparatus. The micro-pulverizing procedure is particularly desirable in the preparation of the friction elements 12 which either have no fibers or make use of the shorter and randomly arranged graphite fibers. The particle size of the coated ingredients for the friction elements is preferably such that 100 percent passes through a 48-mesh screen and at least 80 percent passes through a 100-mesh screen.

After the resin-coated ingredients are mixed, they are evacuated to 10 or 15 m.m. of pressure at room temperature to remove absorbed volitiles. They are stored in a suitable desiccator until used. If a blend of ingredients is to be made, they are blended together and the mass is compressed in a suitable forming mold to form a preform. Both pressure used in making the preform and the hold time before release from the mold are highly critical and depends to some extent on the temperature of the material and whether the powder is graphite or coke. The molding temperature should preferably be room temperature or as low as that where a preform is obtained. A material like pyrolitic carbon, graphites both natural and artificial can be compacted or formed to shape at room temperature. Materials like coke on the other hand, will not form a compact at room temperature and molding temperatures of 200°F. are required. The molding pressure used must be below that where an impervious skin is formed over the surface of the article at molding temperature and time. As the temperature of the material is raised above room temperature, the maximum pressure given compactable material must be reduced to prevent skin formation. In the case where South West Graphite is used, densification pressures usable generally run between 10 and 25 TSI (tons per square inch) and temperatures usable are generally between room temperature and 250°F. Room temperature is preferred. In the case where artificial or pyrolytic graphite is used, a higher densification pressure may be used without delamination at the same temperature. In practice, we have found it expedient to run a pressure curve at the temperature used and to determine the pressure where cracks occur during a post-curing and/or carbonizing operation. The maximum pressure below crack-forming pressure is most desirable to produce products of highest density and strength.

After the mold is brought to the pressure, the preform is preferably immediately released and placed in a postcuring oven where it is cured at a progressively increasing temperature designed to allow escape of gases, including $H_2O$ generated by further condensation of the resin.

The temperature in the post-curing is usually increased stepwise to around 450°F., over about a 48 to 50-hour period. Temperatures where greatest production of gases occurs may be maintained for longer periods.

From the post-cure the articles are heated slowly in inert atmosphere preferably nitrogen over a period of several days stepwise to temperatures of about 1800°F., where carbonization of carbonizable constituents is complete. A typical schedule for carbonization is zero to 450°F., as fast as possible, from 450°F. to 1250°F. at 15° to 25° per hour, and from 1250°F. to 1850°F. at 100° per hour, and then holding at 1800°F. under $N_2$ for 1 hour. Even after carbonization, the article is still somewhat hygroscopic and tends to absorb moisture from the air. After densification, exposure to humidity where absorption takes place is therefore undesirable. Any absorbed moisture must be removed before graphitization to prevent spalling of the material when subjected to raised heat cycling. However, as the density of carbonized product is increased, the tendency to absorb water is reduced.

From the carbonization the shaped article is subjected to graphitization at 1800°C. to 2300°C. or 2500°C. in a nitrogen atmosphere. In the graphitization, the article may be quite rapidly heated (200°C. to 550°C. in 1 hour; 550°C. to 750°C. in 4 hours; 750°C. to about 1000°C. in 1 hour; and 1000°C. to 2500°C. in 2 hours.

The cores as aforesaid comprise a much larger percentage of the carbon (including graphite) fibers than is present in the friction elements that may be fastened to the core faces. The fibers may be even 100 percent of the non-resinous ingredients used for forming the core preform. Usually, however, we prefer to incorporate some carbon or graphite powder, with the fibers to increase density, while the friction elements or other molded articles with which this invention is primarily concerned, are all made by molding dry powders, the cores may be either by a wet process or by a dry process.

In the dry process, the fibers and any powders (graphite or carbon), are coated with the resin binder, such for example as the aforementioned L-8 Resin and dried in the same way as the materials for the friction faces, or friction elements. When the resin-treated and dried materials are milled before being compressed into preformed shape, the subsequent procedure may be identical to that used for friction elements. The pressure used may be 8 to 25 TSI. The preform may be stripped from the mold as soon as it reaches molding temperature. In the case where the fibers are relatively long and are not milled after resin temperature, it is found desirable to mold at a temperature of about 350°F. at 1 to 6 TSI and maintain temperature for about one-half hour or so before stripping from the mold to develop adhesion of fibers to each other.

When the cores are made by wet process, the fibers preferably in conjunction with some carbon or graphite powder are wet with a solution of the resin and the mixed wet materials are air-dried in contact with previously carbonized and graphitized friction elements in preform shape within or without the mold, but preferably in the mold cavity. One or 1½ to 2 TSI pressure is applied to the fibers during subsequent curing of the composite. Solvent and volatile matter are desirably first removed by reduced pressure and then the residue is compressed and heated to a curing temperature. The non-resinous solids may be entirely carbon (including graphite) fibers, but to improve density as aforesaid, up to 25 or 30 percent of graphite powder is desirable.

The friction elements may be combined with the core in several ways. The friction elements previously carried through the graphitization stage may be placed against the uncured but predried core material in a mold, whereupon the composite is subjected to resin-curing conditions and thereafter subjected to carbonization and graphitization procedure, as above described.

Alternatively, the core can be carbonized or preferably graphitized and the friction elements thereafter attached by a cementing operation in cavities molded in or machined in the core.

A suitable cement comprises carbon or graphite particles and a carbon-forming resin, such as furfuryl alcohol-oxalic acid mixture. Union Carbide's C-34 CEMENT is a desirable cement. Surfaces to be combined are best first sanded to remove any dense skin. The surfaces are then preferably coated and wiped clean with a catalyzed furfuryl alcohol (e.g. furfuryl alcohol having 5 percent phthalic anhydride or oxalic acid) coated with the cement and cemented surfaces placed in contact. The composite is then cured under some pressure in an oven, say 4 hours at 100°C., then 16 hours at 120°C. to 130°C.

After the densification, or preferably after the carbonization and graphitization, the shaped preforms may be saturated with a carbon-producing liquid, such as a catalyzed furfuryl alcohol, and again cured and carbonized to further densify the article as before. This subsequent treatment is especially desirable for the production of cores which gain more density and strength than do the higher density friction elements.

The fibers if present in friction elements are a relatively small proportion, generally less than 10 percent and preferably about 2 to 5 percent. Some are often desirable to provide passageways for volatiles in the case where exceptionally fine graphite powders, such as South West Graphite, are used. More than 10 percent of the fibers tends to lower the density of the resultant product too drastically to provide the requisite heat-sink. This is especially the case unless the carbonized material is thereafter saturated (impregnated) with a high carbon-producing liquid and carbonizing steps repeated. Higher percentage of the fibers improve abrasion resistance.

The carbon or preferably graphite powders should make up at least 40 percent or a preferably major portion of the ingredients used in forming the components in the friction elements. Preferably 50 to 70 percent is present. The binder resin should be sufficient to coat the particles and fibers used and generally should constitute at least 20 percent of the weight of the particulate and fibrous ingredients. The amount of binder should at least be sufficient to fill the interstices between the compressed inorganic solid ingredients; this usually comprises 30 to 40 percent of the composition. Up to 45 percent of the composition may be in some cases be resinous binder.

The frictional components, such as high hardness or abrasive ingredients, need be used in only small proportion; as little as 0.5 or 1 percent gives noticeable improvement. Less than 5 percent of the weight of the total before carbonization usually provides adequate frictional effect. Generally 3 to 5 percent of the finely divided abrasive silicon carbide is about optimu, although up to 10 or 15 percent of frictional components may be present, particularly when more than one is used.

The following examples, in which parts are be weight, illustrate the present invention.

EXAMPLE I

Preparation of Coated Graphite

650 Grams of previously dried Southwest Graphite having a particle size of less than 6 microns are tumbled in a sigma blade mixer with a solution of 700 grams of about 50 percent solution of a condensation product of phenol, naphthylenediol and formaldehyde in MEK obtained from the Ironsides Resins, Inc., of Columbus, Ohio under the tradename L-8 RESIN. After tumbling the graphite-resin mixture for ½ hour, the material is removed and placed in an oven, raised gradually from room temperature to 200°F. to evaporate the solvent and remove volatiles. About 1,000 grams of coated graphite containing about 35 percent by weight of the L-8 RESIN is obtained. After milling to a powder and vacuuming at room temperature, the material has a volatile content of 1 to 2 percent measured by loss of weight after heating at 325°F. for 10 minutes.

EXAMPLE II

Preparation of Coated Abrasive Ingredient

735 Grams of silicon carbide, having a particle size such that 80 percent passes through a standard 600-mesh screen, are mixed in a sigma blade mixer with 1,000 grams of a solution of L-8 RESIN in methylethylketone containing 265 grams of the resin. After tumbling for ½ hour in a ball mill, the material is similarly placed in an oven and dried. The resultant material contains about 26.5 percent by weight of resin. The volatile content is about 1 to 2 percent.

EXAMPLE III

Preparation of Coated Fibers

60 Grams of chopped graphite fibers having an average length of ¼ inch and a modulus of 50 are tumbled with 100 Grams of a 40 percent solution of L-8 RESIN in methylethylketone for 10 minutes in a sigma blade mixer. The resultant mixture is removed and dried to produce, after drying as in Example I, 100 Grams of coated graphite fibers containing about 40 percent of L-8 RESIN.

EXAMPLE IV 94.2 parts by weight of the coated graphite of Example I; 4.17 parts by weight of the coated silicon carbide of Example II, and 5.41 parts by weight of the coated graphite fibers of Example III are mixed together to provide a mixture consisting of about 59% of graphite, 34.69% of the L-8 RESIN, 3.06% of silicon carbide, and 3.25% by weight of fibers. The mixture thus obtained is passed through a micro-pulverizer and pulverized so that 100% 100 percent through 100-mesh screen. The powdered material is then subjected to reduced pressure of below 17 m.m. or usually 10 to 15 m.m. to remove absorbed water. The mixture thus obtained is placed in a suitable mold heated to 200°F., and then shaped to produce a friction element 12, and pressed at a pressure of 12 tons per square inch. The shaped mixture removed from the mold is then post-cured by heating it under nitrogen 4 hours at 150°F., followed successively by 4 hours at 200°F., 16 hours at 250°F., 4 hours at 300°F., 4 hours at 350°F., 16 hours at 400°F., and 4 hours at 450°F. The cured article thus produces is then carbonized in a carbonizing furnace by heating it under nitrogen from 200°F. to 450°F., as rapidly as convenient, then progressively raising the temperature at the rate of 15° to 25° per hour to 1250°F., followed by raising the temperature at the rate of about 100°F. per hour to 1800°F. where it is held for one hour.

In the above example, using 12 TSI, the density of the carbonized material is about 1.69 and has flexural strength of about 6450 PSI.

EXAMPLE V

The product of Example IV is transferred to a graphitizing furnace and heated under nitrogen at the rate of 200° to 500°C. per hour, up to 550° to 750°C. where that temperature is maintained for 4 hours. The temperature is then raised from 750° to 1000°C. in 1 hour and then further increased from 1000°C. to 1800°C. in 2 hours. It is maintained at a temperature between 1800°C. and 2400°C. for a couple of hours to complete the graphitization. The graphitized product has a density of 1.67.

EXAMPLE VI

The coated graphite of Example I alone is passed through a micro-pulverizer and vacuumed as in Example IV molded at 10 TSI, at 200°F. The product is then promptly removed without cooling the mold, post-cured and carbonized as in Example IV. The molded density is 1.66, carbonized density is 1.71 and flexural strength is 5500 PSI.

EXAMPLE VII

When the molding pressure used for forming the raw molded product in Example VI is varied between 4 and 20 tons, other conditions remaining, the properties as shown in the following Table I are obtained:

TABLE I

| Molding Pressure (TSI) | Molded Density | Carbonized Density | Flexural Strength (PSI) |
|---|---|---|---|
| 4 | 1.5 | 1.53 | 2,400 |
| 12 | 1.68 | 1.74 | 6,400 |
| 20 | 1.73 | 1.81 | 8,000 |

EXAMPLE VIII

When the material of Example VII is cold molded at room temperature other conditions remaining the same the properties shown in Table II are obtained.

TABLE II

| Molding Pressure (TSI) | Molded Density | Carbonized Density | Flexural Strength (PSI) |
|---|---|---|---|
| 10 | 1.6 | 1.6 | 4,000 |
| 25 | 1.72 | 1.75 | 6,800 |
| 40 | 1.74 | 1.81 | 8,200 |

EXAMPLE X

The graphite of Example I is coated with an equal weight of a 50 percent solution in MEK of a resol phenol-formaldehyde resin having a volatile content of about 10 percent and obtained under the trade-name "IIII NS RESIN", from said Ironsides Resins, Inc. The mixture is made as in Example I and after drying, grinding and pressing as in Example I, has a volatile content as determined by observing weight loss upon heating at 325°F. for 10 minutes of 0.5 to 1.5 percent.

The coated graphite is substituted for the coated graphite in Example VI, all conditions remaining the same except that all heating is necessarily under nitrogen. The post-curing of the molded product is obtained by heating it 4 hours at 150°F., plus 24 hours at 200°F., plus 16 hours at 250°F., plus 4 hours at 300°F., plus 4 hours at 350°F., plus 16 hours at 400°F., plus 24 hours at 450°F. The post-cured products are then carbonized according to the following schedule: Heat to 450°F., as rapidly as convenient then raise temperature 15° to 25° per hour to 650°F., then raise from 650°F. to 1100°F. at 10°F. per hour, then raise from 1100°F. to 1250°F. at 15° to 25° F. per hour and then raise from 1250°F. to 1800°F. at 100°F. per hour. During the curing and carbonization steps, pieces are merely stacked between alternate graphite plates.

Properties of product of above Example X are shown in the following Table IV.

TABLE IV

| Molding Temperature Room | Molding Pressure (TSI) | Density As Molded | Density Carbonized | Flexural Strength (PSI) |
|---|---|---|---|---|
|  | 10 | 1.63 | 1.63 | 3,400 |
|  | 20 | 1.74 | 1.75 | 4,600 |
|  | 40 | 1.80 | 1.83 | 6,500 |

EXAMPLE XI

A product is made in Example X and molded at 20 TSI having dimensions of 6 × 3.5 × ⅝ inch was graphitized under nitrogen according to the schedule of Example V. The density after graphitization is 1.81 and the flexural strength is 4,975 PSI.

The forgoing examples have dealt primarily with utilization of graphite powders in making molded articles, it is found that high grade articles, it is found that high grade articles may also be made from coke powder. Whereas graphite particles may be compacted cold to make a preform, coke particles were found not to form a cold compact and the resin coated coke particles are therefore hot molded at temperatures where the resin is thermoplastic, i.e., about 200°F. Furthermore, it is found that in the case of coke, the hold time at molding temperature is not so critical. Skin formation has not occurred with a 5-minute hold time in the mold. Release from the mold is as in the case of graphite made at molding temperature so that reduced process cost is still obtained.

It is found that the following procedure is highly desirable in forming molded articles from non-graphitized carbon such as coke powder or a carbon which can not be compacted at room temperature.

A. The powdered carbon, which should preferably pass through a 100-mesh screen, is dried to constant weight at 350°F.

B. The carbon after being allowed to cool to 200°F., or 250°F. is mixed thoroughly with a thermosetting phenolformaldehyde condensation product preferably a resol type, in varnish or solution form. The solvent is preferably MEK or isopropyl alcohol and the solution is preferably preheated to about 200°F. The mixture may be made in a suitable sigma blade mixer and continued until room temperature is used.

C. To give process uniformity, the mixture thus produced is pressed out into thin sheet or plate form. In the absence of solvent, these thin sheets are hard when cold.

D. The plates or sheets thus formed are then broken up and micro-pulverized in a suitable micro-pulverizer.

E. The micro-pulverized product is placed under a reduced pressure of 10 or 15 millemeters or less of mercury to boil off any water formed and reduce absorbed gases. The volatile content should be less than 4 percent or preferably less than 3.5 percent.

F. The powdered product thus obtained is molded at a temperature where the resin binder is plastic, preferably about 200°F., and released at mold temperature. The molding pressure should not appreciably exceed 20 TSI and is preferably 8 to 14 TSI, but lower molding pressures of 1½ or 2 TSI may be used when the material is held in the mold a few minutes before it is released.

G. The molded piece is post-cured under nitrogen or other inert atmosphere according to the following preferred schedule:
1. Held at 150°F. for 4 hours, then
2. Temperature held at 200°F. for about 1 day, then
3. Held at 250°F. for about 16 hours, then
4. Held at 300°F. for 4 hours, then
5. Held at 400°F. for 16 hours, then
6. Held at 450°F. for 24 hours.

The thus post-cured molded article is then carbonized under nitrogen as follows:
A. Pieces are stacked between carbon plates and heated to 450°F. as rapidly as practical, then
B. The temperature is raised 15° to 25°F. per hour to 650°F., then
C. Raised about 10°F. per hour to 1100°F., then
D. Raised 15° to 25°F. per hour to 1250°F., then
E. Raised about 100°F. per hour to 1800°F.

The product is then cooled in the furnace under nitrogen to 450°F.

The above process provides a solid high strength article without cooling the molds before the molded articles are stripped therefrom.

If in place of the ordinary resol phenolic varnish, the much more expensive L-8 RESIN before mentioned, or the borinated phenolic Resin solutions is used. The post-curing need not be carried out in a nitrogen or inert atmosphere that is found to be essential with the ordinary phenolic Resins to prevent an apparent increase in weight during the curing process.

If graphitizations is desired, the carbonized articles may be graphitized by stacking them between graphite plates in a suitable furnace and heating them under nitrogen as were the materials in Example V supra.

The following examples illustrate the preparation of molded articles from non-graphitized carbon (coke) powder.

One-hundred parts (Example 12) by weight of pure finely ground petroleum coke is dried to constant weight at 350°F., cooled to 250°F., mixed in a sigma blade mixer with 133 parts by weight of a 50 percent solution in MEK of a resol phenol-formaldehyde resin that was preheated to 200°F. The mixing is conducted for 35 minutes. The mixture thus obtained is sheeted out to about 1/16 inch thickness and the substantially dry hard sheet thus obtained which appeared to have a volatile content of 1 percent is micro-pulverized so that 100 percent passes through a 100-mesh screen. The product thus obtained had a much increased volatile content and was subjected to a pressure of 10 m.m. of mercury at room temperature to reduce volatile content then molded in a mold at 200°F. Some samples were immediately released from the hot mold and others were held 5 minutes at molding pressure. Variations in molding pressures and variations in volatile content prior to molding were made as shown in the following Table V.

The molded product was post-cured and carbonized under nitrogen in accordance with the foregoing schedule for molded products from carbon. The results were as shown in Table V.

TABLE V

| Pressing Method | % Volatile | *Molding Pressure (TSI) | Maximum Carbonized Strength | Density Carbonized Strength |
|---|---|---|---|---|
| Mold 200°F., 5' Hold. | 3.4 | 2 | 14,300 | 1.67 |
| Mold 200°F., No Hold. | 3.4 | 10 | 10,500 | 1.55 |
| Mold 200°F., 5' Hold. | 2.0 | 4 | 8,300 | 1.57 |
| **Mold 200°F., No Hold. | 2.0 | 20 | 5,500 | 1.50 |
| Mold 200°F., No Hold. | 2.0 | 20 | 4,800 | 1.50 |

*Pressure where maximum carbonized strength occurred.
**Material heated 5 minutes at 150°F., before molding.

* Pressure where maximum carbonized strength occurred.
** Material heated 5 minutes at 150°F., before molding.

While the 2-ton pressure gave exceptional results at the 5 minute hold time, it was found that small variations of pressure /or temperature caused delaminations. Much less criticality was experienced when higher pressures and immediate release was used.

In the above examples, small amounts of the uncoated devoltalized carbon and/or graphite may be blended with the resin coated graphite particles before the material is molded. Pyroletic graphite may be used in place of or in part for the natural graphite.

Boronated phenol-aldehyde resins or borophenolic-formaldehyde resins or mixtures of such with other phenolic resins are advantageously used in place of the resins mentioned. This is especially true in the case of friction components because of their superior performance under the most severe conditions.

When the core material is to be produced the silicon carbide in the above axample may be eliminated. Longer fibers are also preferably used, and mixing may be accomplished in a suitable blender to maintain fiber length. Orientation of the fibers may be obtained by working the mass of powder in circular directions.

In the preparation of the composite friction components, a plurality of the friction elements with outer faces adhered to a suitable circular paper backing and having the friction elements arranged in a circular manner is placed against the flat mold surfaces with the paper against the metal thereof. The molding pressure is applied through the paper and the friction element to cause the core material to flow about the bevelled surfaces of the core. The composite is then treated to post-cure, carbonize and graphitize as before. If desired, the post-cured or carbonized friction elements may be molded on the core material before they are graphitized or carbonized and simultaneous graphitization or carbonization can occur. The core and friction elements are preferably impregnated after carbonization with furfuryl alcohol. The post-curing and carbonizing procedure is then repeated as before. The density of the core is usually between 1.3 and 1.45 or even up to 1.5.

In the compositions of the above examples there may be incorporated additional powdered ingredients, such as tungsten carbide, tantalum carbide, boron nitride, boron carbide, silica of various particle size, including sand, (silex), fumed silica, silica aerogels, silica xerogels, etc. Materials which are not fusible or reactive with the carbon at graphitizing temperatures are preferred. The number of additional ingredients having sufficiently high melting points is very limited, however.

It is also apparent that in accordance with the provisions of the Patent Statutes modifications of the invention may be made without changing the spirit thereof.

Having described our invention, we claim:

1. A method of making a friction element suitable for receiving the rapidly dissipated energy produced in stopping jet aeroplanes, said method comprising (a) coating a finely powdered graphite, graphite fibers, and an abrasive powder that is stable at graphitizing temperatures with a heat-setting, resole phenol-aldehyde resin, said resin being heat-setting to the infusible, insoluble state, removing volatiles therefrom while in the powdery state and at a temperature maintained below resin-curing temperatures; (b) preparing an intimate mixture of 1 to 10 percent by weight of said fibers, 40 to 70 percent by weight of said graphite powder, 1 to 10 percent by weight of said abrasive powder, and 20 to 45 percent by weight of said resin; (c) compressing said intimate mixture to form a preform at a pressure of 10 to 25 TSI but at a pressure below that which forms an impervious skin over the surface of said preform; (d) curing said preform to complete condensation of said resin binder while allowing vapors evolved to escape without rupturing said preform; (e) carbonizing said cured preform by slowly raising the temperature thereof to carbonize said resin while permitting gas or vapors formed to escape without rupture of said preform; and (f) graphitizing the carbonized preform by raising the temperature thereof at a controlled rate to between 1800° C. and 2500° C.

2. The method according to claim 1 wherein said resin is a resol phenol-formaldehyde resin and said graphite has an average particle size less than 30 microns.

3. The method of claim 1 wherein said graphite powder, graphite fibers, and said abrasive powder are separately coated with the resin.

4. A method for making a brake component for cooperating with another component in absorbing energy, the steps which comprise separately making a friction elements according to the method of claim 1, preparing a core for carrying said elements by making a mixture comprising resin-coated graphite fibers, resincoated graphite powder having an average particle size of less than 30 microns, said resin being a resol phenol-formaldehyde resin, predrying and volatilizing said mixture until the volatile content is less than 5 percent at 180°F., placing friction elements against each of two opposite flat circular mold faces, placing said mixture in contact with one face of each of said friction elements and shaping said mixture by applying pressure through said friction elements to form a disc-like composite preform having said friction elements attached and partly embedded in the opposite faces thereof, curing, carbonizing and graphitizing the resin in said preform to integrally bond said fibers, said graphite particles and said friction elements together.

5. The method of claim 4 wherein the graphitized article is further impregnated with a liquid selected from the group consisting of furfuryl alcohol and phenol-formaldehyde resins and the impregnated article is again subjected to graphitizing.

6. A method for making a brake component for cooperating with another component in absorbing energy, the steps which comprise separately making a friction elements according to the method of claim 1, preparing a core for carrying said elements by making a mixture comprising resin-coated graphite fibers and resin-coated graphite powder having an average particle size of less than 30 microns, said resin being a resol phenol-formaldehyde resin, predrying and volatilizing said mixture to a volatile content of less than 5 percent at 180°F., forming said mixture into disc shape with said friction elements attached to each of the opposite circular faces thereof, curing, post curing, carbonizing, and graphitizing the resin in said disc-shaped mixture and integrally bonding said friction elements, said fibers and said particles together.

7. The process of claim 6 wherein said mixture is molded into disc shape cured and carbonized separately from said friction elements; the molding pressure being below that where an impervious skin is formed over the surface of the article, and below that where cracks occur during the post curing and carbonizing operations; and attaching friction said elements to opposite faces of said core which comprises the steps of lightly sanding surfaces to be placed into contact to remove any dense surface skin, coating the sanded surfaces with a catalized furfuryl alcohol, placing the coated surface together and curing the composite under heat and pressure.

8. The method of claim 6, wherein said mixture is molded to disc shape, cured and carbonized separately from said friction elements to form a core for carrying a plurality of friction elements at each of the flat faces thereof, said core having a plurality of depressions of shape and size of the friction elements in each of the opposite faces of the disc-like core, each depression being adapted to receive a separately formed friction element, said depressions having slopping side walls and being narrower in the plane of the outer flat surfaces of the core than at the bottom thereof, inserting and cementing a friction element in each of said depressions with a carbonizable cement and subsequently carbonizing the cement.

9. A process for producing molded articles which consist principally of carbon and which have relatively high strength and resistance to decomposition by frictional heat, which comprises drying a finely divided carbon powder to constant weight at about 350°F., coating the powder while at a temperature of 200° to 250°F. with a preheated resol-type phenol-formaldehyde resin, pulverizing the dry mixture thus obtained, volatilizing the coated powder to a volatile content of less than 4 percent, molding the powder at a pressure of at least 1½ TSI and at a temperature and pressure and for a time below that where surface porosity is reduced to the point where delamination of the molded article occurs but at a temperature where a solid compact is obtained, stripping the product from the mold at substantially the mold temperature, heating the molded article at gradually increasing temperatures over a period of more than one day to about 450°F., to insure complete condensation of the resin and then carbonizing the product in an inert atmosphere at gradually increasing temperatures to 1800°F., over a period of more than one day.

10. The method of claim 8 where in the resin also contains a member selected from the group consisting of organic borates, boronated phenols, and zinc borates, whereby improved high temperature oxidation resistance is obtained.

11. The method of claim 8 wherein the phenol-formaldehyde resin is a resol type condensation product comprising 2, 7 naphthylene diol, phenol and formaldehyde also containing a small amount of hexamethylene tetramine.

12. The method of claim 8 wherein the carbon powder is a coke powder, the molding temperature is 150° to 200°F., and the molding pressure is 8 to 14 TSI.

13. The method of claim 8 wherein the carbon powder is graphite and the resin is a thermosetting phenol-formaldehyde condensation product.

14. The method of claim 12 wherein said molding is carried out at termperatures lower than 150°F., and the mold is stripped promptly after pressure is reached whereby formation of a uniform compact occurs.

15. The method of claim 13 wherein a small amount of an abrasive powder is incorporated with the finely divided coated graphite particles prior to molding.

16. The method of claim 8 wherein the volatile content of the coated powder is not in excess of 3.5 percent.

17. The method of claim 8 wherein the carbonized product thus produced is graphitized by heating it at temperatures that are incrementally increased over a period of several days to at least 2300°C.

* * * * *